(12) United States Patent
Sei

(10) Patent No.: US 10,178,273 B2
(45) Date of Patent: Jan. 8, 2019

(54) IMAGE DATA CONVERSION BASED ON ACTUAL SIZE

(71) Applicants: KABUSHIKI KAISHA TOSHIBA, Tokyo (JP); TOSHIBA TEC KABUSHIKI KAISHA, Tokyo (JP)

(72) Inventor: Masaaki Sei, Kannami Tagata Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 69 days.

(21) Appl. No.: 15/389,063

(22) Filed: Dec. 22, 2016

(65) Prior Publication Data

US 2018/0183976 A1    Jun. 28, 2018

(51) Int. Cl.
*H04N 1/393*    (2006.01)
*H04N 1/00*    (2006.01)

(52) U.S. Cl.
CPC .......... *H04N 1/393* (2013.01); *H04N 1/0057* (2013.01); *H04N 1/0071* (2013.01); *H04N 1/00708* (2013.01); *H04N 1/00801* (2013.01); *H04N 1/00811* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 5,159,681 A | * | 10/1992 | Beck | G06K 15/00 358/1.17 |
| 5,717,842 A | * | 2/1998 | Ambalavanar | G06F 3/1296 358/1.15 |
| 6,701,124 B2 | * | 3/2004 | Sakai | H04N 1/00681 399/370 |
| 7,321,694 B2 | * | 1/2008 | Kato | H04N 1/41 358/1.12 |
| 2003/0174354 A1 | | 9/2003 | Oteki | |
| 2016/0070219 A1 | * | 3/2016 | Ono | G03G 15/50 399/86 |
| 2017/0180602 A1 | * | 6/2017 | Yoshida | H04N 1/3935 |

FOREIGN PATENT DOCUMENTS

JP    2003-283791 A    10/2003

* cited by examiner

*Primary Examiner* — Paul F Payer
(74) *Attorney, Agent, or Firm* — Patterson & Sheridan, LLP

(57) ABSTRACT

An image reading apparatus includes a tray, first sensors configured to acquire information related to a maximum size of sheets placed on the tray, a scanner configured to generate first image data for each of the sheets conveyed from the tray based on the maximum size, a sheet conveyor configured to convey the sheets placed on the tray toward the scanner, second sensors configured to acquire information related to an actual size of each of the sheets conveyed by the sheet conveyor, and a controller. The controller converts for each of the sheets having an actual size that is different from the maximum size, the first image data stored in a first memory region into second image data based on the maximum size and the actual size of the sheet, and stores the second image data in a second memory region which is different from the first memory region.

18 Claims, 7 Drawing Sheets

IMAGE DATA CONVERSION BASED ON ACTUAL SIZE

FIELD

This specification relates to an image reading technology using an automatic document feeder (hereinafter referred to as "ADF") and a scanner, in which first image data that is generated based on a maximum sheet size is converted into second image data based on an actual sheet size.

BACKGROUND

Conventionally, a scanner reads an image on a sheet conveyed by an ADF based on a size of the sheet determined from user inputs or sensor data generated by sheet size detection sensors installed on a sheet tray of the ADF. As the size of the ADF has become smaller in recent years, the sheet conveying distance measured from the tray to the scanner has also become shorter. As a result, it is difficult to measure the actual size of the conveyed sheets prior to scanning them. Therefore, the scanner generates image data of the conveyed sheets based on a maximum size of the conveyed sheets, and not their actual size. This may not be problematic if the conveyed sheets are of the same size but leads to scanning an unnecessarily large area and generating unnecessary image data if some of the sheets are smaller in size than the maximum size.

DETAILED DESCRIPTION

An image reading apparatus, according to an embodiment, includes a tray, first sensors configured to acquire information related to a maximum size of sheets placed on the tray, a scanner configured to generate first image data for each of the sheets conveyed from the tray based on the maximum size, a sheet conveyor configured to convey the sheets placed on the tray toward the scanner, second sensors configured to acquire information related to an actual size of each of the sheets conveyed by the sheet conveyor, and a controller. The controller converts for each of the sheets having an actual size that is different from the maximum size, the first image data stored in a first memory region into second image data based on the maximum size and the actual size of the sheet, and stores the second image data in a second memory region which is different from the first memory region.

Embodiments are described below with reference to the accompanying drawings.

Figure 1:
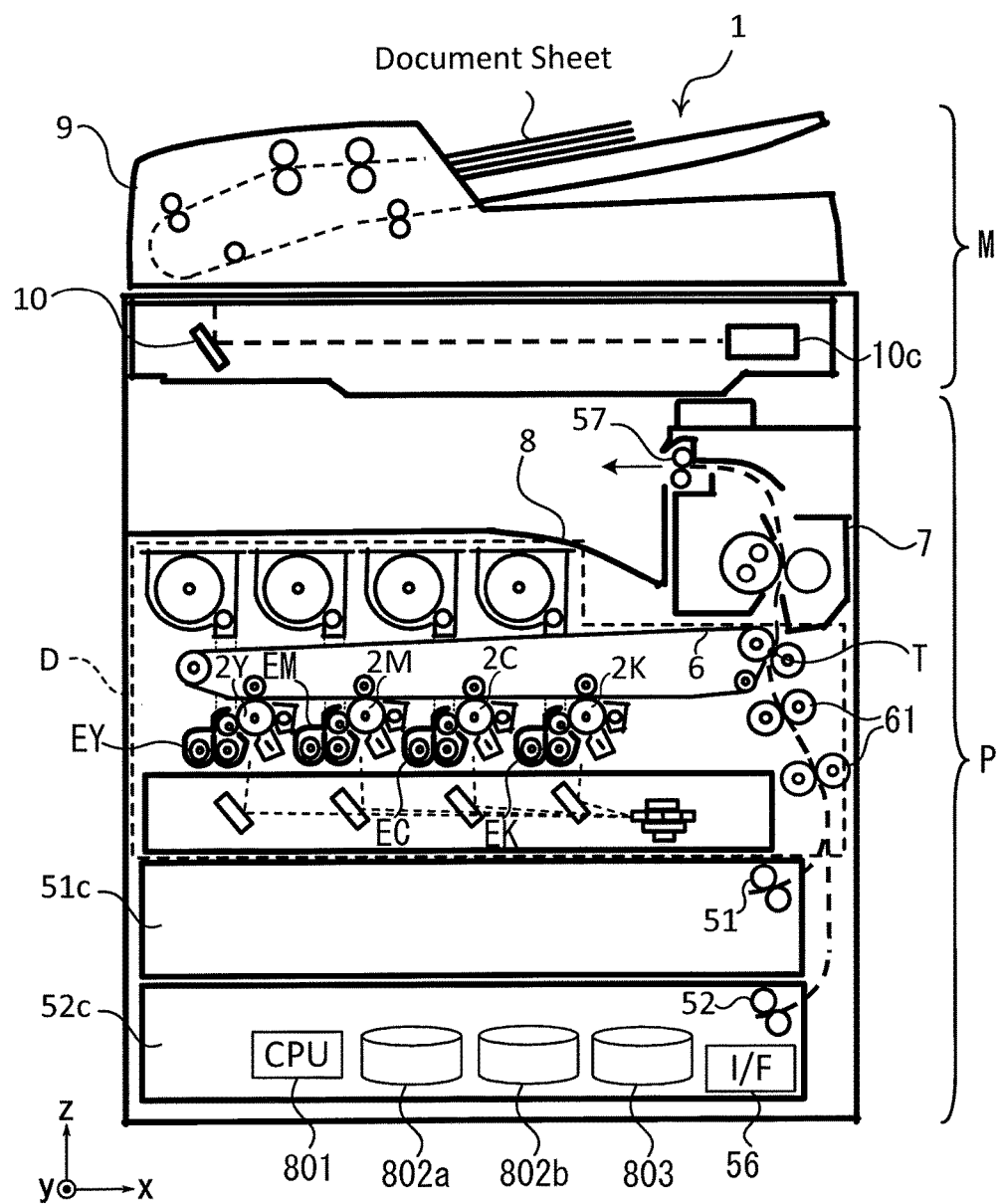
FIG. 1 is a vertical cross-sectional view of an image processing apparatus in which embodiments may be carried out.

FIG. 1 is a vertical cross-sectional view of an image processing apparatus 1 in which embodiments may be carried out. As shown in FIG. 1, the image processing apparatus 1 has an image forming section P and an image reading section M.

The image forming section P includes, for example, photoconductive drums (2Y, 2M, 2C, 2K), an operation panel 58, developing units (EY, EM, EC, EK), a rotating intermediate transfer belt 6, sheet cassettes 51c and 52c, pickup rollers 51 and 52. The image forming section P forms an image on a sheet such as a printing paper or film on the basis of image data generated by the image reading section M or image data transmitted from an external device.

Figure 2:
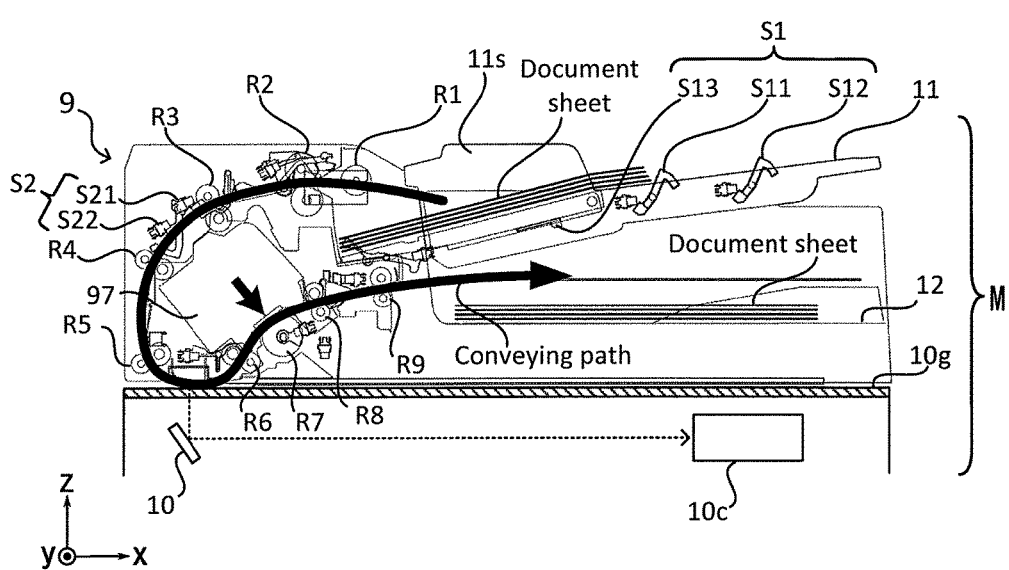
FIG. 2 is a vertical cross-sectional view of a mechanism of an image reading section of the image processing apparatus.

The reading section M, illustrated in further detail in FIG. 2, includes an ADF 9 and a scanner 97 that scans sheets placed on a tray 11 of the ADF 9 and conveyed to the scanner 97. As shown in FIG. 2, the ADF 9 includes a scanner 97, a sheet supply tray 11, sheet conveying rollers R1 to R9, a sheet discharge tray 12, first sensors S1 (S11, S12 and S13), and second sensors S2 (S21 and S22).

In the ADF 9, rollers R1 to R9 are arranged along the sheet conveying path (depicted by a solid arrow in FIG. 2) to convey sheets stacked on the sheet supply tray 11 to the sheet discharge tray 12 through the scanner 97. Two of the rollers R1 to R9 perform additional functions. The roller R1 is a pick-up roller and is configured to pick up a sheet from the sheets stacked on the sheet supply tray 11, and the roller R3 is a register roller and is configured to correct the skew of the sheet picked up by the roller R1 and conveyed along the sheet conveying path by the roller R2.

As the sheet is conveyed along the sheet conveying path by the rollers R1 to R9, one side of the sheet is read by the scanner 97 and the other side of the sheet is read by a scanning optical system 10 and CCD 10c through a platen glass 10g. The scanner 97 is, for example, a CCD line sensor, and is configured to optically read an image on the conveyed sheet.

The sheets which are subjected to the image reading process described above are set on the sheet supply tray 11. The first sensors S1 (S11, S12 and S13) are installed on an upper surface of the sheet supply tray 11 and generates sensor data based on which a maximum size of bundle of sheets placed on the sheet supply tray 11 is detected.

The first sensors S1 include sheet length detection sensors S11 and S12, and a sheet width detection sensor S13. As used herein, "sheet length" is measured in the direction of sheet conveyance, and "sheet width" is measured in the Y-axis direction, which is the orthogonal to the direction of sheet conveyance.

The sheet length detection sensors S11 and S12 generate sensor data based on which a maximum length of the sheet bundle placed on the sheet supply tray 11 is detected. The sheet width detection sensor S13 generates sensor data based on which a maximum width of the sheet bundle placed on the sheet supply tray 11 is detected. In one embodiment, the sheet width detection sensor S13 senses a position of side guides 11s arranged on the sheet supply tray 11 and positioned on either side of the sheet bundle in the Y-axis direction to press against the sheet bundle placed on the sheet tray 11.

An image reading operation and an image forming operation carried out by the image forming apparatus will now be described.

First, the image reading section M scans an image of a sheet conveyed through an image scanning position within the ADF. As described above, image scanning is performed by the scanner 97 and the scanning optical system 10.

Second, the image forming section P forms electrostatic latent images on photoconductive surfaces of photoconductive drums (2Y, 2M, 2C, 2K) (respectively containing different color toners, e.g., yellow (Y), magenta (M), cyan (C), and black (K)), according to user inputs made through an operation panel 58 (shown in FIG. 3) and the image data generated by the image reading section M. The For example, in cases where the user has selected the option to scale scanned images prior to image forming, if the user sets the size of the sheet to be scanned and the size of the sheet to be image-formed to be both A4-size, no magnification or reduction of the scanned image is needed. In other words, the magnification percentage is 100%. On the other hand, if the user sets the size of the sheet to be scanned to be B5-size and the size of the sheet to be image-formed to be A4-size, magnification of the scanned image (the magnification percentage is 114%) is needed prior to image forming.

The image forming section P forms electrostatic latent images on photoconductive surfaces according to the above-described magnification percentage. Subsequently, toner in developing units (EY, EM, EC, EK) is supplied to the photoconductive surfaces of the photoconductive drums (2Y, 2M, 2C, 2K) to form toner images on the photoconductive surfaces. The toner images formed on the photoconductor surfaces are transferred to a surface of the rotating intermediate transfer belt 6, and the rotating intermediate transfer belt 6 transports the toner images to a transfer position T where the toner images are transferred onto a sheet.

In parallel, the sheet is picked up from a user-selected sheet cassette 51c or 52c by pickup rollers 51 or 52, and transferred to the transfer position T by a plurality of sheet conveying rollers 61.

After the toner images are transferred to the sheet at the transfer position T, the sheet is further conveyed to a heater 7, at which the image is fixed on the sheet. Then, the sheet having the fixed image is conveyed through a discharge conveyance path by a plurality of conveying roller pairs and discharged onto a discharge tray 8 by discharge rollers 57.

Figure 3:
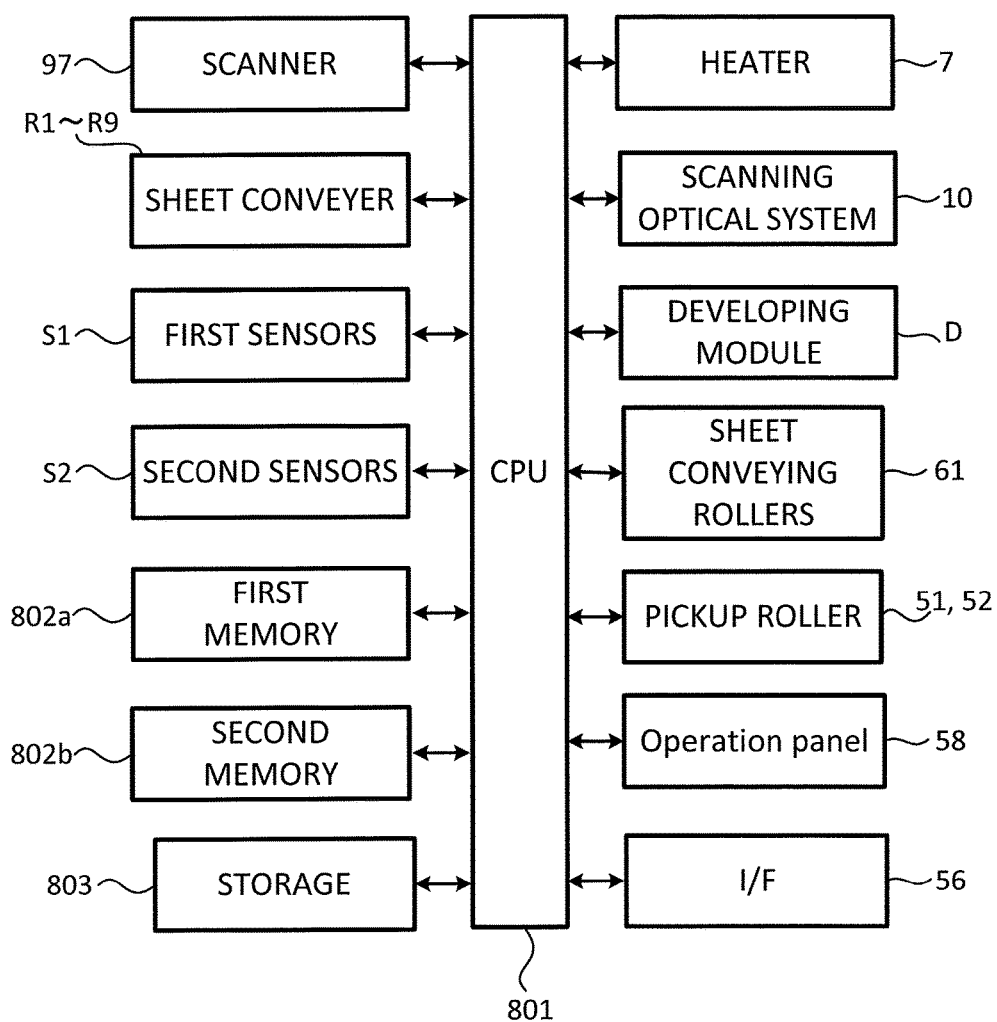
FIG. 3 is a block diagram of components of the image processing apparatus.

As shown in FIG. 3, the image processing apparatus 1 further includes a processor 801, such as a CPU (Central Processing Unit), a first memory 802a, a second memory 802b, a storage device 803, and a communication I/F 56. The processor 801 performs control operations on the components of the image processing apparatus 1 by transmitting commands through a bus. When image data to be image-formed is not generated by the image reading section M but is from an external device, the image data from the external device is received through the communication interface 56.

The processor 801 controls the components of the image reading section M, including the scanner 97, the scanning optical system 10, sheet conveying rollers R1-R9, the first sensors S1, the second sensors S2, a first memory 802a, and a second memory 802b. In the embodiments, each of the first memory 802a and the second memory 802b is a memory device, e.g., a RAM (Random Access Memory). Further, a first memory region, the use of which is described below, is provided in the first memory 802a, and a second memory region, the use of which is described below, is provided in the second memory 802b. In one embodiment, the processor 801 stores the image data in the second memory region in units of a page.

The processor 801 controls the components of the image forming section P, including the heater 7, a developing module D (including the components described above for forming an unfixed toner image on a sheet), sheet conveying rollers 61, storage 803, the operation panel 58, the communication interface 56, and other units of the image processing apparatus 1, which is described in this embodiment, by executing a control program. Further, the processor 801 is programmed to perform various image processing functions. In alternative embodiments, the processor 801 may be replaced by an ASIC (Application Specific Integrated Circuit) or programmable logic devices such as FPGA (Field Programmable Gate Array).

The storage 803 stores application programs and the OS in a non-volatile manner. The application programs include a program that executes the functions of the image processing apparatus 1, including a copy function, a print function, and a scanner function. Further, the storage 803 stores image data generated by the image reading section M or received over a network from an external device through the communication I/F 56. Examples of the storage 803 include a magnetic-storage device, such as a hard disk drive, an optical storage device, a semiconductor storage device (flash memory or the like), or a combination of these devices.

As described above, the first sensors S1 include the sheet length detection sensors S11 and S12 generate sensor data based on which a maximum length of the sheet bundle placed on the sheet supply tray 11 is detected. In one embodiment, the sheet length detection sensors S11 and S12 are optical sensors that generate "1" data when they are blocked, e.g., by a sheet and a "0" data when they are not blocked. The sheet length detection sensors S11 and S12 are placed at predetermined locations along the tray so that they can be used to detect three sheet lengths. For example, if both sheet length detection sensors S11 and S12 are not blocked, the sheet length is detected to be L1. If the sheet length detection sensor S11 is blocked but the sheet length detection sensor S12 is not blocked, the sheet length is detected to be L2, where L2>L1. If both sheet length detection sensors S11 and S12 are blocked, the sheet length is detected to be L3, where L3>L2.

The first sensors S1 also include the sheet width detection sensor S13, which as described above, senses a position of side guides 11s arranged on the sheet supply tray 11 to detect the sheet width.

It should be recognized that, in cases where the sheet bundle stacked on the sheet tray 11 has sheets of different size, the first sensors S1 detects the length and the width of the largest sheet in the sheet bundle. Therefore, in the embodiments, the first sensors S1 detect a maximum size of the sheets in the sheet bundle, i.e., the maximum sheet size.

The second sensors S2 (S21 and S22) generate sensor data based on which an actual size of the sheet conveyed by the conveying rollers R1 to R9 is detected. The second sensors S2 include a passage sensor S21 and sheet width detection sensors S22. The passage sensor S21 is an optical sensor that detects by blockage of light, when a sheet conveyed along a sheet conveying path by the conveying rollers R1 to R9 passes thereby. The sheet width detection sensors S22 are optical sensors that are arranged at two different width positions and detect by blockage of light an actual width of the sheet when the sheet is conveyed by the conveying rollers R1 to R9 past the location of the width detection sensors S22.

Figure 4:
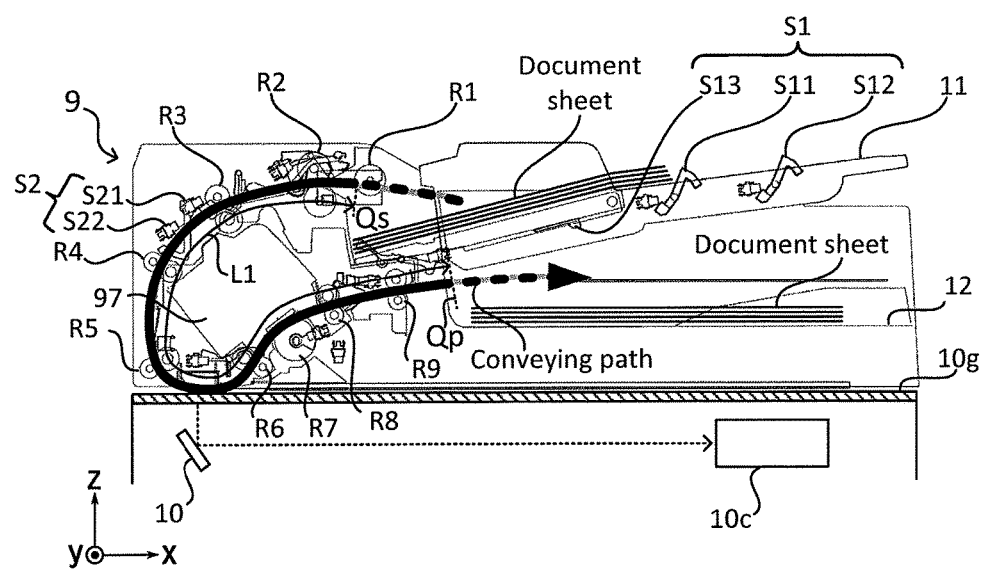
FIGS. 4 and 5 are each a vertical cross-sectional view of the reading section, in which different sheet conveying distances are depicted to illustrate a problem addressed by the embodiments.
Figure 5:
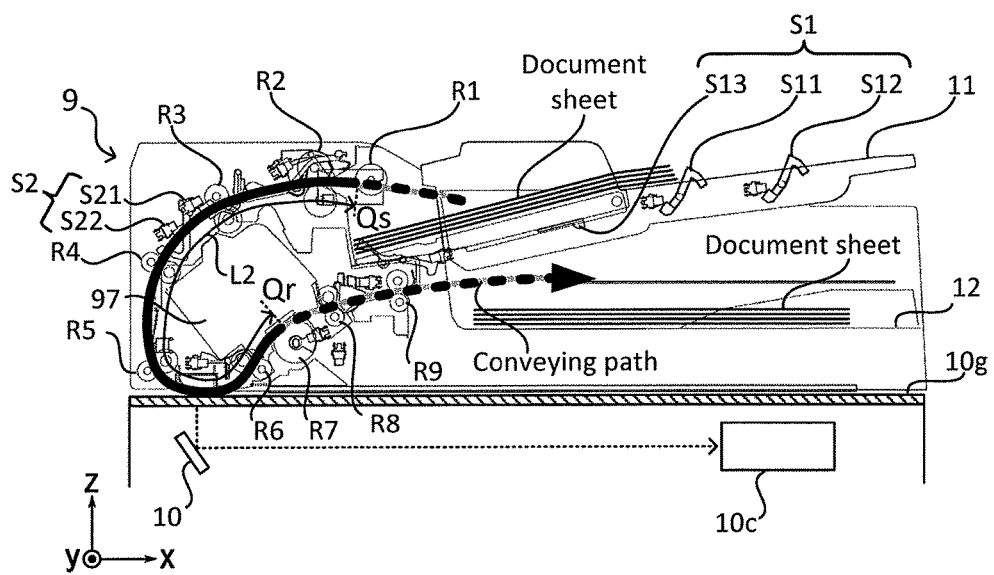

FIGS. 4 and 5 are each a vertical cross-sectional view of the reading section, in which different sheet conveying distances are depicted to illustrate a problem addressed by the embodiments.

A first sheet conveying distance L1 is depicted in FIG. 4. The first sheet conveying distance L1 represents the distance that the sheet must be conveyed before the actual length of the sheet can be determined. As shown, the sheet needs to be conveyed until its rear edge passes by the passage sensor S21, so that the sheet no longer blocks the light into the passage sensor S21, for the actual length of the sheet to be determined.

A second sheet conveying distance L2 is depicted in FIG. 5. The second sheet conveying distance L2 represents the distance from a position Qs of the passage sensor S21 to a position Qs at an image reading position Qr of the scanner 97.

As shown in FIGS. 4 and 5, the first sheet conveying distance L1 is longer than the second sheet conveying distance L2. As the ADF 9 has become more compact, the first sheet conveying distance L1 is longer than the second sheet conveying distance L2 for most of standard sheet sizes. Therefore, in the embodiments, image data generated by the image reading section M is converted in situations where the actual sheet size is greater than the sheet size that the image section M relied on to generate the image data. As a result, image data corresponding to scanned areas outside the sheet are not stored.

Figure 6:
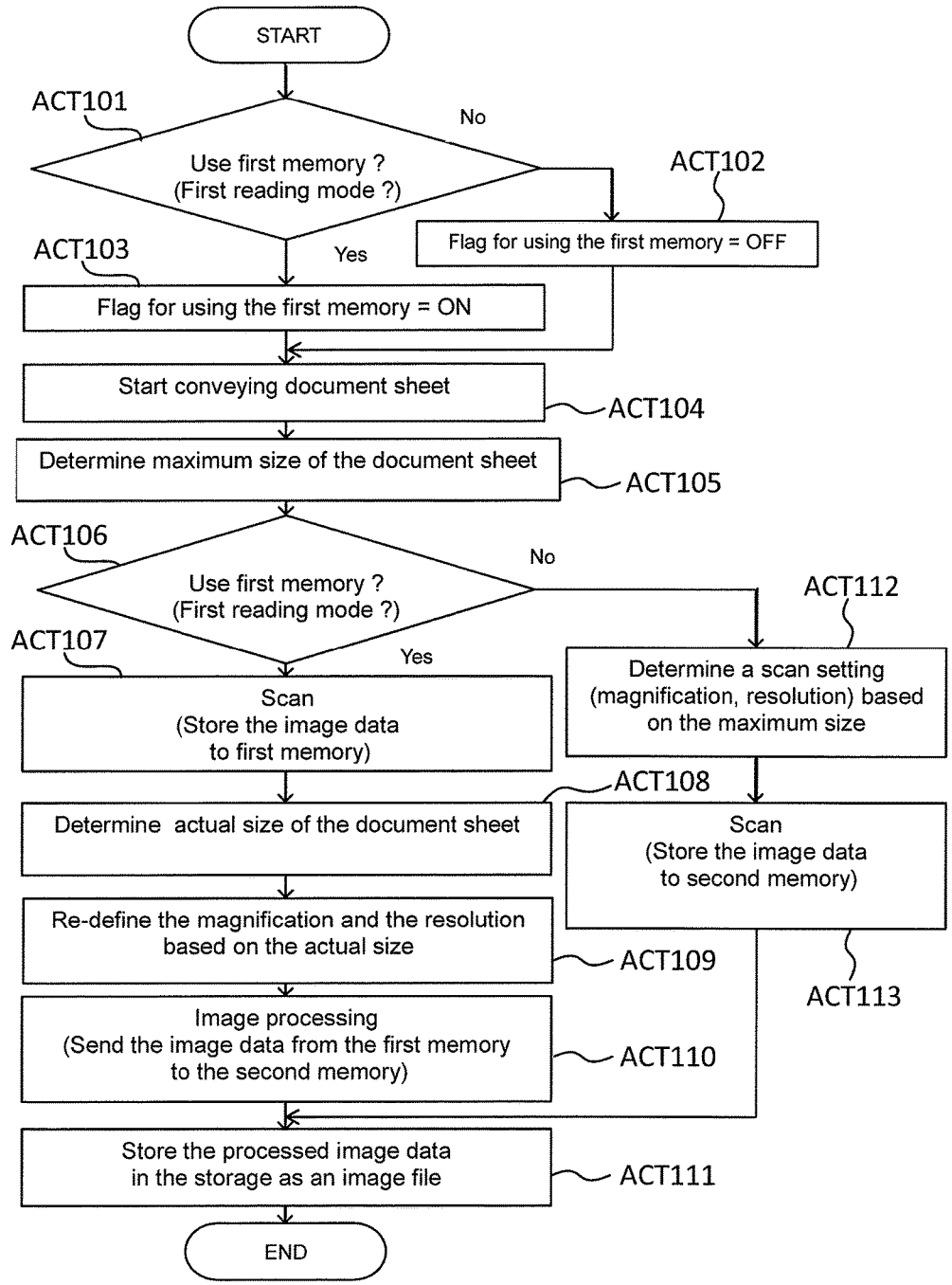
FIG. 6 is a flow chart of an image reading operation according to an embodiment.

FIG. 6 is a flow chart of an image reading operation according to the embodiment. First, the processor 801 determines a reading mode selected between a "first reading mode" and a "second reading mode" (ACT101). The "first reading mode" is a reading mode for sheet bundles with mixed size sheets. The "second reading mode" is a reading mode for sheet bundles with same size sheets.

If the "first reading mode" is not selected (ACT101, No), the processor 801 turns off a flag for using the first memory 802a (ACT102). On the other hand, if the "first reading mode" is selected (ACT101, Yes), the processor 801 sets a flag for using the first memory 802a (ACT103).

Next, the processor 801 causes the rollers R1 to R9 to start conveying the sheets stacked on the sheet supply tray 11 (ACT104). The processor 801 determines the maximum size (maximum length, maximum width) of the sheet bundle based on sensor data of the first sensors S1 (ACT105).

Subsequently, the processor 801 determines a reading mode selected between a "first reading mode" and a "second reading mode" again (ACT106). If the "first reading mode" is not selected (ACT106, No), the processor 801 determines a scan setting (e.g., magnification and resolution) based on the maximum size of the sheet bundle determined in ACT105 (ACT112).

After the determination of the scan setting, the processor 801 causes the scanner 97 to read the image on the sheet based on the user-selected scan setting and stores the generated image data in the second memory region of the second memory 802b (ACT113).

On the other hand, if the "first reading mode" is selected (ACT106, Yes), the processor 801 causes the scanner 97 to read the image on the sheet based on the maximum size of the sheet bundle and stores the generated image data in the first memory region of the first memory 802a (ACT107).

Next, the processor 801 determines the actual size of the sheet based on the detection result by the second sensors S2 (ACT108). Then, the processor 801 re-defines the magnification setting and the resolution setting based on the actual size of the sheet (ACT109), and processes the image data stored in the first memory region of the first memory 802a and stores the processed image data in the second memory region of the second memory 802b (ACT110). The processing includes conversion of the image data stored in the first memory region based on the re-defined magnification and resolution settings into second image data and storing of the second image data in the second memory region, when the actual size of a sheet detected by the second sensor S2 is different from the maximum size for the sheet.

After ACT110 and ACT113, the processor 801 stores the image data in storage as an image file (ACT111).

Figure 7:
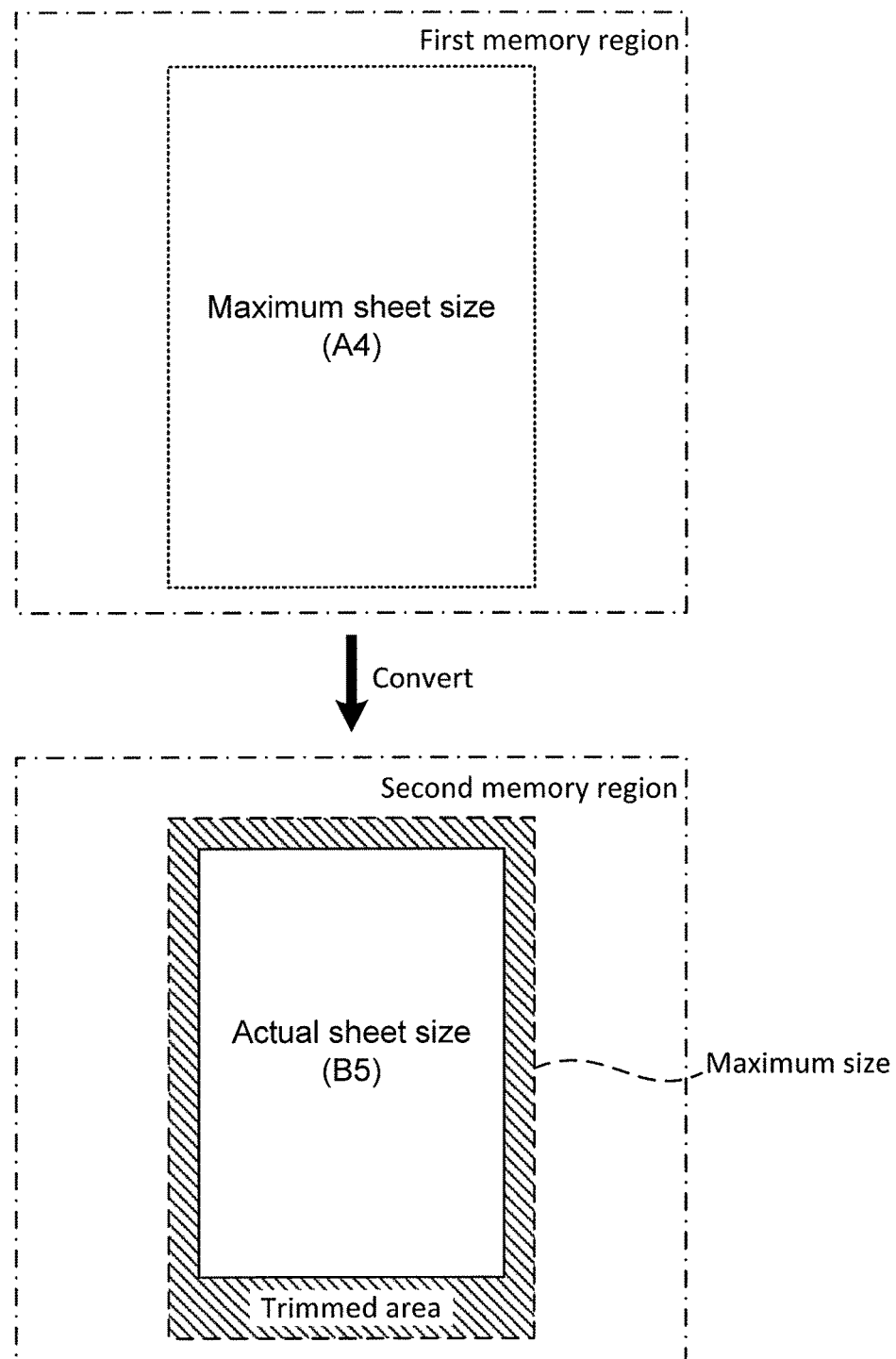
FIG. 7 is a conceptual view illustrating the conversion of image data according to embodiments.

FIG. 7 is a conceptual view illustrating the conversion of image data according to embodiments. It is assumed in the example illustrated in FIG. 7 that the sheet bundle includes A4-size sheets and B5-size sheets. Accordingly, the maximum length and width of the sheet bundle would be determined to be the length of the A4-size sheet and the width of the A4-size sheet, respectively.

If the image reading process is performed on an A4-size sheet of the sheet bundle, the actual size of the sheet scanned will match the maximum size of the sheet bundle, and thus a conversion of the image data will not be necessary. On the other hand, if the image reading process is performed on a B5-size sheet of the sheet bundle, the actual size of the sheet scanned will not match (be smaller than) the maximum size of the sheet bundle. Thus, image data generated from scanning the B5-size sheet will include unnecessary image data, which is illustrated in FIG. 7 as the image data around the B5-size sheet image data. According to the embodiments, the processor 801 converts the image data stored in the first memory region (first image data) into second image data by trimming the unnecessary image data in the first image data, and stores the second image data in the second memory region. Accordingly, the image data of the B5-size sheet stored in storage is made smaller as a result of the conversion.

After image reading, the processor 801 controls image forming by first acquiring target size information input by the user on the operation panel 58 to define a size of an image to be formed on a sheet. The processor 801 converts the image data in storage to a target size image data based on the target size information. After the conversion, the processor 801 causes the image forming section P to form an image on a sheet based on the converted image data.

In the above-described embodiment, the first memory 802a and the second memory 802b are different memory devices. In alternative embodiments, the first memory 802a and the second memory 802b may be the same memory device, and the first memory region and the second memory region are provisioned from the same memory device.

Further, in the above-described embodiment, the image processing apparatus has one CPU 801 and each of processes of the image processing apparatus is executed by the CPU 801 as an example. In alternative embodiments, the processes of the image processing apparatus may be distributed across a plurality of processors.

According to this embodiment, even when it is not possible to detect the actual size of a sheet before starting the scanning of the sheet, the image reading apparatus can obtain image data that is based on the sheet's actual size.

While certain embodiments have been described, the embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image reading apparatus comprising:
a tray;
first sensors configured to acquire information related to a maximum size of sheets placed on the tray;
a scanner configured to generate first image data for each of the sheets conveyed from the tray based on the maximum size;
a sheet conveyor configured to convey the sheets placed on the tray toward the scanner;
second sensors configured to acquire information related to an actual size of each of the sheets conveyed by the sheet conveyor;
a controller configured to convert for each of the sheets having an actual size that is different from the maximum size, the first image data stored in a first memory region into second image data based on the maximum size and the actual size of the sheet, and to store the second image data in a second memory region which is different from the first memory region, wherein
the controller determines a reading mode selected between first and second reading modes, wherein the first reading mode is a reading mode for sheet bundles with mixed size sheets and the second reading mode is a reading mode for sheet bundles with same size sheets, and
the controller enables the usage of the first and second memory regions when the first reading mode is selected and enables the usage of the second memory region but not the first memory region when the second reading mode is selected.

2. The apparatus according to claim 1, wherein
the first and second memory regions are regions of a volatile memory.

3. The apparatus according to claim 1, wherein
image data including the second image data are stored in the second memory region in units of a page.

4. The apparatus according to claim 1, wherein
the second reading mode is a reading mode in which the size of the sheet to be read is determined based on a selection by a user.

5. The apparatus according to claim 1,
the second reading mode is a reading mode in which image processing for the image data read by the scanner is performed based on the maximum size of the sheet without using the actual size of the sheet detected by the second sensors.

6. The apparatus according to claim 1, wherein
the first reading mode is a reading mode in which an actual size of each the sheets is determined.

7. The apparatus according to claim 1, further comprising:
a first memory having the first memory region; and
a second memory having the second memory region, which is different from the first memory.

8. The apparatus according to claim 1, wherein
the first sensors include at least a sheet width detection sensor used in detecting a size of the sheet placed on the tray in a direction orthogonal to a sheet supplying direction from the tray by the sheet conveyor.

9. The apparatus according to claim 1, wherein
the second sensors include at least a passage sensor which detects a passage of the sheet conveyed along a sheet conveying path by the sheet conveyor.

10. An image reading method in an image reading apparatus having a tray, first sensors configured to acquire information related to a maximum size of sheets placed on the tray, a scanner configured to generate first image data for each of the sheets conveyed from the tray based on the maximum size, a sheet conveyor configured to convey the sheets placed on the tray toward the scanner, and second sensors configured to acquire information related to an actual size of each of the sheets conveyed by the sheet conveyor, said method comprising:
acquiring the information related to the maximum size of sheets placed on the tray;
generating first image data for each of the sheets conveyed from the tray based on the maximum size;
conveying the sheets placed on the tray toward the scanner;
acquiring the information related to the actual size of each of the sheets conveyed by the sheet conveyor;
converting for each of the sheets having an actual size that is different from the maximum size, the first image data stored in a first memory region into second image data based on the maximum size and the actual size of the sheet, and to store the second image data in a second memory region which is different from the first memory region;
determining a reading mode selected between first and second reading modes, wherein the first reading mode is a reading mode for sheet bundles with mixed size sheets and the second reading mode is a reading mode for sheet bundles with same size sheets; and
enabling the usage of the first and second memory regions when the first reading mode is selected and enabling the usage of the second memory region but not the first memory region when the second reading mode is selected.

11. The method according to claim 10, wherein
the first and second memory regions are regions of a volatile memory.

12. The method according to claim 10, wherein
image data including the second image data are stored in the second memory region in units of a page.

13. The method according to claim 10, wherein
the second reading mode is a reading mode in which the size of the sheet to be read is determined based on a selection by a user.

14. The method according to claim 10,
the second reading mode is a reading mode in which image processing for the image data read by the scanner is performed based on the maximum size of the sheet without using the actual size of the sheet detected by the second sensors.

15. The method according to claim 10, wherein
the first reading mode is a reading mode in which an actual size of each the sheets is determined.

16. The method according to claim 10, wherein
the first memory region is in a first memory; and
the second memory region is in a second memory, which is different from the first memory.

17. The method according to claim 10, wherein
the first sensors include at least a sheet width detection sensor used in detecting a size of the sheet placed on the tray in a direction orthogonal to a sheet supplying direction from the tray by the sheet conveyor.

18. An image processing apparatus comprising:
a tray;
first sensors configured to acquire information related to a maximum size of sheets placed on the tray;
a scanner configured to generate first image data for each of the sheets conveyed from the tray based on the maximum size;

a sheet conveyor configured to convey the sheets placed on the tray toward the scanner;

second sensors configured to acquire information related to an actual size of each of the sheets conveyed by the sheet conveyor;

a controller configured to convert for each of the sheets having an actual size that is different from the maximum size, the first image data stored in a first memory region into second image data based on the maximum size and the actual size of the sheet, to store the second image data in a second memory region which is different from the first memory region, to convert the second image data into a target size image data based on a target size information which defines a size of an image to be formed on a sheet; and an image forming unit configured to form an image on a sheet based on the image data converted based on the target size information, wherein the controller determines a reading mode selected between first and second reading modes, wherein the first reading mode is a reading mode for sheet bundles with mixed size sheets and the second reading mode is a reading mode for sheet bundles with same size sheets, and the controller enables the usage of the first and second memory regions when the first reading mode is selected and enables the usage of the second memory region but not the first memory region when the second reading mode is selected.

* * * * *